(12) United States Patent
Hilde

(10) Patent No.: US 8,810,779 B1
(45) Date of Patent: *Aug. 19, 2014

(54) SHAPE MATCHING AUTMATIC RECOGNITION METHODS, SYSTEMS, AND ARTICLES OF MANUFACTURE

(71) Applicant: The United States of America, as represented by the Secretary of the Navy, Washington, DC (US)

(72) Inventor: Jeffrey Jay Hilde, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,195

(22) Filed: Aug. 23, 2013

Related U.S. Application Data

(63) Continuation of application No. 13/849,649, filed on Mar. 25, 2013.

(51) Int. Cl.
  *G01C 3/08* (2006.01)
(52) U.S. Cl.
  USPC ......... 356/4.01; 356/3.01; 356/4.1; 356/5.01; 356/5.1

(58) Field of Classification Search
  CPC ..... G01S 7/4802; G01S 17/89; G06K 9/3241; G06K 9/00201; G01B 11/24
  USPC ............. 356/3.01–3.15, 4.01–4.1, 5.01–5.15, 356/6–22, 28, 28.5
  See application file for complete search history.

(56) References Cited

U.S. PATENT DOCUMENTS 7,616,817 B2    11/2009  Hilde
2008/0273210 A1*  11/2008  Hilde ............................ 356/601

OTHER PUBLICATIONS

U.S. Appl. No. 11/787,343, Jeffrey Jay Hilde.

* cited by examiner

*Primary Examiner* — Luke Ratcliffe
(74) *Attorney, Agent, or Firm* — Christopher L. Blackburn; James M. Saunders

(57) ABSTRACT

Systems, methods, and articles of manufacture for automatic target recognition. A hypothesis about a target's classification, position and orientation relative to a LADAR sensor that generates range image data of a scene including the target is simulated and a synthetic range image is generated. The range image and synthetic range image are then electronically processed to determine whether the hypothesized model and position and orientation are correct. If the score is sufficiently high then the hypothesis is declared correct, otherwise a new hypothesis is formed according to a search strategy.

12 Claims, 7 Drawing Sheets

SHAPE MATCHING AUTOMATIC RECOGNITION METHODS, SYSTEMS, AND ARTICLES OF MANUFACTURE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments generally related to automatic target recognition systems and methods.

Figure 1:
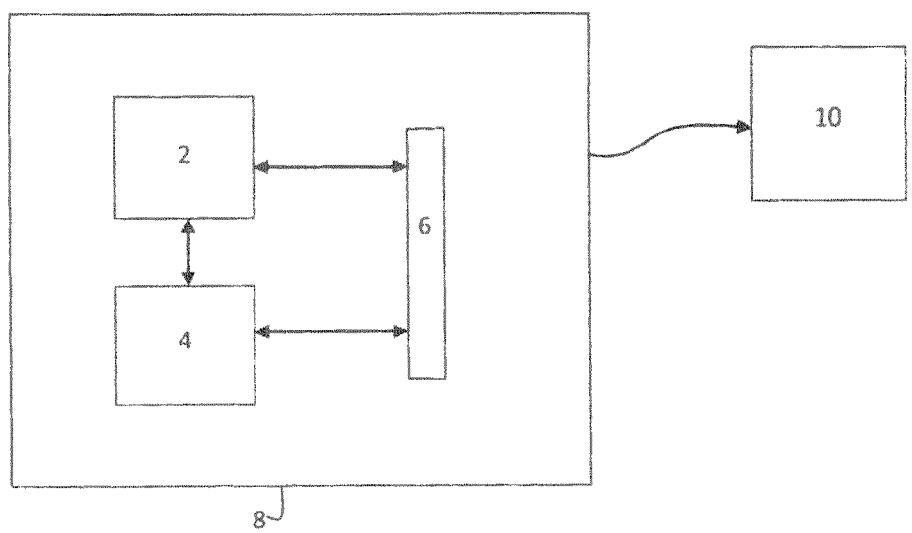
FIG. 1 illustrates components of some system and/or article of manufacture embodiments.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

At the outset, it is perhaps helpful to describe conventions and input.

Input

Embodiments of the invention use the following input data generated conventionally unless otherwise stated; 1) sensor range image; 2) target information; 3) initial target search parameter extents; 4) target model to be used during the current model iteration set; 5) k; 6) L; 7) l; 8) d (where d is a factor less than or equal to 1); 9) h; 10) w; 11) matching score threshold value; 12) var1 value; 13) var2 value; 14) var3 value, 'h' is a value from the range of values between and including zero and four; w is selected from the range of values between and including zero and four. k and L are set experimentally and are a function of the range noise of said sensor and object modeling errors. L is a value (in meters) in the range of (and including) 0 to 10, depending on the fineness of the sensor. k is a value in the range of (and including) 0 to 7. l is set to the degree to which a normal distributed random variable is desired; it serves as an index (with a lower value of greater than or equal to 1), and as the value 1 as l gets larger, the distribution becomes more and more normal.

In some embodiments, L=3 and k=0. In some of these embodiments, h=1 and w=1.

In some embodiments, L=8 and k=7. In some of these embodiments, h=1 and w=1.

The value of var2 is greater than the value of var3 and var1 value is greater than L. In some embodiments, var2 is 1, var3 is 0, and var1 is the value to which the depth butter was initialized.

Range Imaging Sensor

A range-imaging sensor is any combination of hardware and software capable of producing a range image of a real-world scene under appropriate operating conditions. In some embodiments, a Laser Detection and Ranging (LADAR) sensor is used to generate the range data from which a range image is generated.

Search Parameter Extent

A "search parameter extent" is the extent of search space assigned to the parameter for the current iteration, and is notionally referred to using the letter 'e' with a subscript g relating the parameter extent values to the hypothesis with which it will be used (or during the iteration of which it was calculated). A parenthetical following the 'e' indicates the search parameter the value is associated with. For example, using the 'g' scheme in FIG. 3, $e_g(a)$ would indicate the search extent value of the $a^{th}$ search parameter calculated during the $g^{th}$ hypothesis. As a notational note, $e_g=\{e_g(a), a=1\ldots b\}$, where b is equal to the number of search parameters.

Initial Search Parameter Extent (Input)

The initial search parameter extent may be selected based on a-priori knowledge of target performance. For example, if the set of potential target models is a set of different sea-going vessels, an initial search parameter extent for the iteration's pitch parameter may be selected based on a-priori knowledge that sea-going vessels tend to experience pitch variations within plus or minus 5 degrees. Therefore, the initial search parameter extent for pitch in tins example would be set to e=5. The manner of setting the initial search parameter extents is not unique to this patent; any conventional means of arriving an initial search parameter extent may be used.

Range Image

A range image is an image of a physical scene represented in an electronic data structure as a collection of electronic distance measurements (electronic data) from a known reference coordinate system to surface points on object(s) in the scene. If scenes are defined as collections of physical objects and if each object is defined by its mass density function, then surface points are defined as the 3-D points in the halfdensity level set of each object's normalized mass-density function as in Koenderink and VanDoorn (1986). Range images are known by many other names depending on context; range map, depth map, depth image, range picture, rangepic, 3-D image, 2.5-D image, digital terrain map (DTM), topographic map, 2.5-D primal sketch, surface profiles, xyz point list, contour map, and surface height map. If the distance measurements in a range image are listed relative to three orthogonal coordinate axes, the range image is in xyz form. If the distance measurements indicate range along 3-D direction vectors indexed by two integers (i,j), the range image is in $r_{i,j}$ form. Any range image in $r_{i,j}$ form can be converted directly to xyz form, and the x,y,z form as used to represent the target model are converted into the range image $r_{i,j}$ form. Since no ordering of points is required in the xyz form, this is the more general form, but it can be more difficult to process than the $r_{i,j}$ form. If the sampling intervals are consistent in the x- and y-directions of an xyz range image, it can be represented in the form of a large matrix of scaled, quantized range values $r_{i,j}$ where the corresponding x, y, z coordinates are determined implicitly by the row and column position in the matrix and the range value. The term "image" is used because any $r_{i,j}$ range image can be displayed on a video monitor, and it is identical in form to a digitized video image from a television camera. The only difference is that pixel values represent distance in a range image whereas they represent irradiance (brightness) in a video image.

For the purposes of this description, range images are described as being operated on in the $r_{i,j}$ form, but can easily be converted to xyz range form using a standard information matrix and offsets.

Sensor Range Image

A "sensor range image" is a range image of a scene that includes a detected target. The sensor range image is notationally defined as $R=\{r_{ij}, i=1,\ldots b, j=1,\ldots c\}$, where b is the number of columns of pixels in said sensor target range image, c is the number of rows of pixels in said sensor range image, and $r_{ij}$ represents the range between the object at point ij in the sensor range image and the sensor. The scene coordinate frame of reference is the coordinate system with respect to which range values in the range image are calculated.

Figure 5:
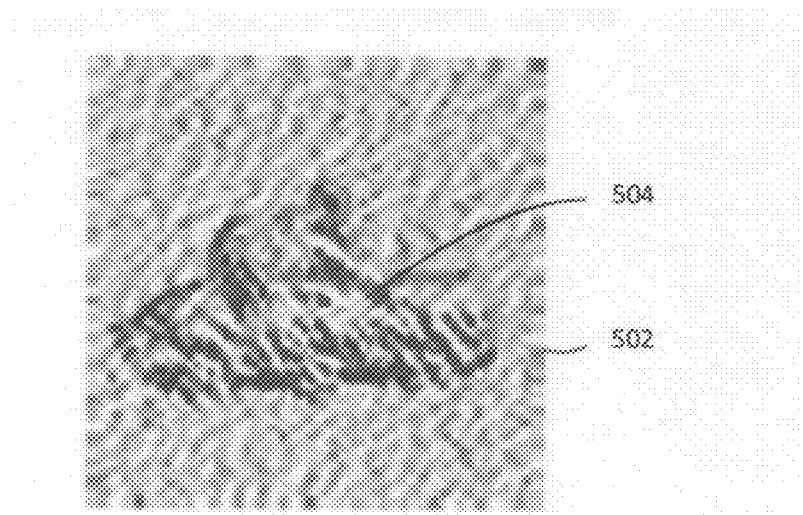
FIG. 5 illustrates an exemplary range image of an exemplary scene including an embodiment of a target.

FIG. 5 illustrates an example of a range image 502 of a target, in this example a tank 54.

Figure 4:
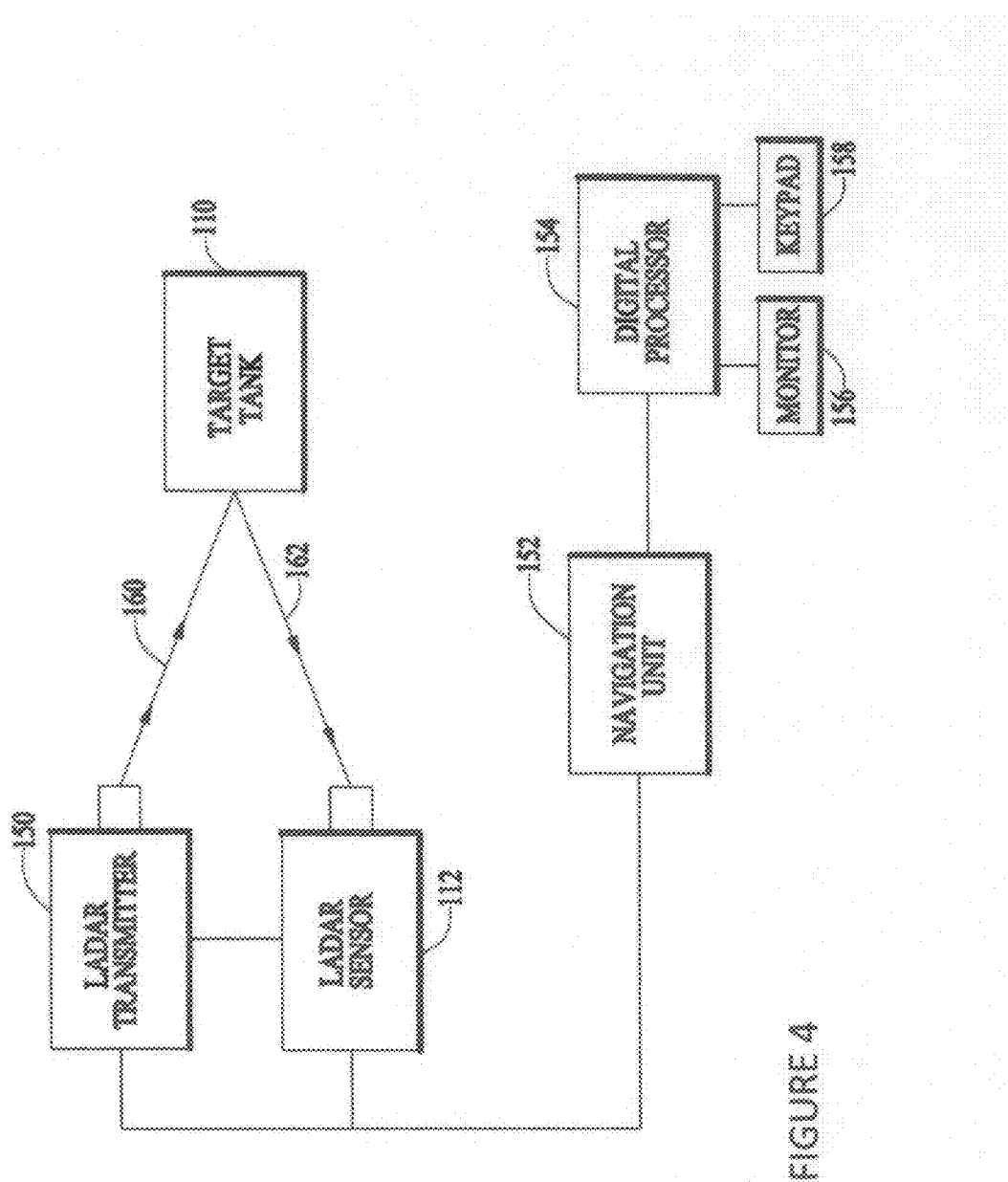
FIG. 4 provides an illustration of components that can be used to either Collect/process/receive data used or manipulated during some embodiments of the invention.

FIG. 4 illustrates a general set up to explain the cooperation of certain elements that are used to either collect/process/receive data used or manipulated during some embodiments of the invention. In particular, 112 illustrates an actual LADAR sensor that receives energy returned by an object (in this example a target tank 110) that was transmitted by LADAR transmitter 160. Navigation unit 152 is co-located with LADAR sensor and provides the location and orientation of LADAR sensor 112 at the time the target tank 110 was imaged. The location and orientation information from the LADAR is used to convert the range image data from LADAR sensor 112 into a world based coordinate system, thereby associating the range data from LADAR sensor with world coordinates.

Target Pose Parameters

"Target pose parameters" are parameters whose values describe the pose of the detected target in the scene coordinate frame of reference. A translation relates the pose of target models in the model coordinate frame of reference to a corresponding pose in the scene coordinate frame of reference. The target pose parameters for a particular hypothesis are collectively notationally represented as $P_g$. Parenthetical (a) identifies a parameter specific value. So, for example, where the target pose parameters are comprises of x, y, z, roll, pitch, and yaw (6 parameters in their respective order) the target pose parameters for a first hypothesis (g=1) would be notationally represented as $P_1=\{P_1(1), P_1(2), P_1(3), P_1(4), P_1(5), P_1(6)\}$, where $P_1(1)$, $P_1(2)$, $P_1(3)$ represent the target pose parameter for the target's x, and z-position, respectively, for the current hypothesis, and $P_1(4)$, $P_1(5)$, $P_1(6)$ represent the target pose parameter values for the target's roll, pitch and yaw for the current hypothesis.

Notice that target velocity can also be modeled by repositioning the target model as a function of time. Where this is done, the sensor range image would be notationally defined as $R=\{r_{tij}, t=1\ldots u, i=1,\ldots b, j=1\ldots c\}$ and the synthetic range image would be defined as $R^s=\{r_{tij}^s, t=1\ldots u, i=1,\ldots b, j=1\ldots c\}$. Equations 4, 6, and 8 would likewise change as follows, respectively:

$$a_g = \frac{\sum_{t=1}^{u}\sum_{i=1}^{b}\sum_{j=1}^{c} \begin{array}{cc} r_{tij}^{s,g} - r_{itj} & \text{if } f_{tij}^{s,g} = \text{true} \\ 0 & \text{if } f_{tij}^{s,g} = \text{false} \end{array}}{\sum_{t=1}^{u}\sum_{i=1}^{b}\sum_{j=1}^{c} \begin{array}{cc} 1 & \text{if } f_{tij}^{s,g} = \text{true} \\ 0 & \text{if } f_{tij}^{s,g} = \text{false} \end{array}}$$

$$d_{t,i,j}^g = \begin{cases} \text{Minimum}\left(\sqrt{((r_{t,i,j}^{S,g} - a_g d) - N_{ij})^2}\right) & \text{if } f_{t,i,j}^{S,g} = \text{true} \\ \text{var1} & \text{if } f_{t,i,j}^{S,g} = \text{false} \end{cases}$$

$$C_g = \sum_{v=0}^{k}\sum_{t=1}^{u}\sum_{i=0}^{b}\sum_{j=0}^{c} \begin{cases} \text{var2} & d_{i,j}^g < T \\ \text{var3} & d_{i,j}^g \geq T \end{cases}$$

Target Search Parameters

"Target search parameters" are parameters of the "target pose parameters" whose values will be considered for variation during a model hypotheses set. In some embodiments, the hypotheses are limited to variation across only one or some of the target pose parameters; values for the parameters across which the hypotheses are allowed to vary are referred to herein as the target search parameters values and notationally collectively represented as $P_s$. Values for target pose parameters that are fixed during the model hypotheses set are referred to as "constant pose parameters" and are notationally referred to as $P_c$, such that $P_g \rightarrow \{P_s, P_c\}$.

For example, in some embodiments, model iteration sets are only allowed to vary across position; in these embodiments, the orientation (roll, pitch, and yaw) parameter values of the hypotheses would remain constant during each iteration of the model iteration set and the "search parameters" would consist only of parameter values describing location. Where 'a' is in parenthesis, such as $P_s(a)$, 'a' represents an index that identifies the search-parameter specific value. For example, where there are three search parameters—x, y, and z position—$P_s(1)$ would be the search parameter value for the x position, $P_s(2)$ would be the search parameter value for the y position, and $P_s(3)$ would be the search parameter value for the z position.

Hypothesis-specific search parameter values are identified using sub-subscript 'g', such as $P_{s_g}(a)$, which would designate a hypothesis-and-search parameter-specific search parameter value. Using the above search parameter examples, $P_{s_2}(1)$ would designate the parameter value of the first search parameter of the second hypothesis.

Rendering

In general, given a 3D scene model G, a pose P, and a sensor type, one can compute the image that would be recorded by a sensor of that type from the specified pose. This computation is referred to as "rendering". A range sensor provides depth information, i.e., the distance from the imaging device. For a range sensor, the resulting rendered image is sometimes referred to as a "synthetic range image." In this case, rendering can be carried out using a hardware Z-buffer, which is computationally efficient. Alternatively, the rendering can be carried out by software. The process is referred to as "range rendering." The field has an extensive literature and range rendering using conventional techniques is known to a person having ordinary skill an the art.

The concept of rendering may be generalized to computing, from a 3D scene model, what would be obtained if an image were recorded and subsequently processed in some way. One example of this is "feature-based rendering." Each object has features which are computed and stored with the object. Feature based rendering computes how those features would appear in the 3D scene model to an observer. Occlusion is used to determine which features are visible, but the appearance of features is computed by projection or some other technique. Hence it is convenient to use "rendering" or "synthetic rendering" to describe the process of computing the information that is expected to appear in the image of a 3D scene model from an observer F at whatever level is appropriate. Particular examples of "rendering" are range rendering, photo-realistic rendering, and feature-based rendering.

Figure 9:
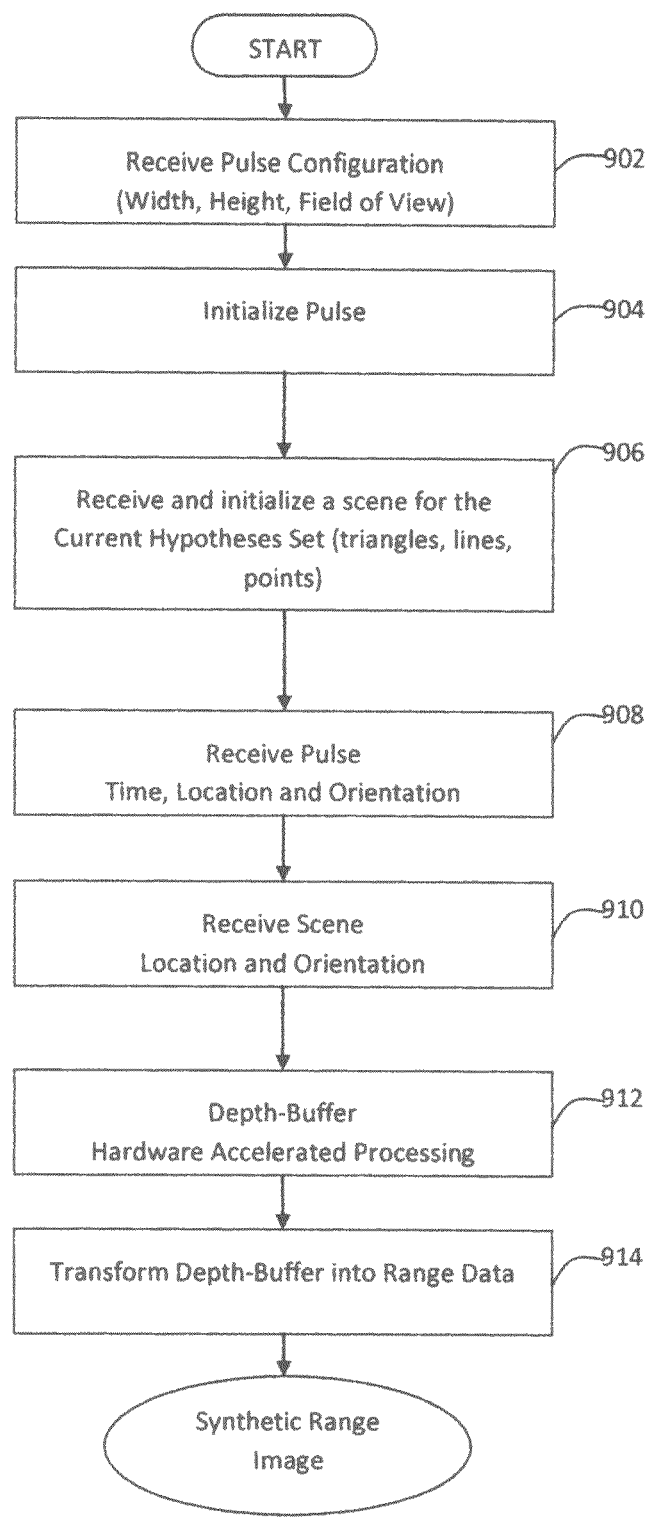
FIG. 9 provides an exemplary diagram of steps employed in generating a synthetic range image according to some embodiments of the invention.

In some embodiments, rendering is performed by a graphics processing unit programmed to perform the steps/acts/processes as illustrated in FIG. 9. With reference to FIG. 9, these embodiments render the synthetic range image by first defining sensor parameters for the sensor model that is used to create the simulation that represents the range image (block 902). In particular, this step involves defining pixels by width and height based on a degree value and the field of view of the modeled sensor With reference to block 904, a pulse is then initialized by configuring the pulse/energy according to constraints imposed by the model sensor parameters. Namely: 1) the energy transmitted by the sensor model is defined to be transmitted in the same direction (in the scene coordinate frame of reference) as the actual sensor is looking so that a return will be measured; and 2) the pulse dimensions are defined to be equal to the angular dimensions of the field of view of the actual sensor.

Next, a scene model (background and target model) is initialized using the 3-D target model of the current model hypotheses set (block 906) in the model frame of reference.

Next, with reference to block 908, location and orientation of the actual sensor is received from the navigation unit, (which outputs xyz location and orientation of the actual sensor in the "scene coordinate system frame of reference"), and uses this information to define die xyz location and orientation of the modeled sensor in the scene coordinate system frame of reference.

Next, with reference to block 910 the scene location and orientation is received. In other words, the scene model is modeled with the target model according to the $P_g$ for the current hypotheses. Recall that $P_g$ defines the pose of the scene (target model) for a particular hypothesis in the scene coordinate frame of reference. At this point, the imaged scene model is defined in xyz form in the scene coordinate frame of reference.

Next, with reference to block 912 depth buffer data of the scene model (the model al Pg) is generated. The depth buffer is initialized to an initial value. All pixels that remain unchanged retain the initial depth buffer value (which allows them to be distinguished from pixels that lie on the target), The depth-buffer data is an array of depth values, one depth value for each pixel of the sensor focal plane array. This computer graphics hardware processing can be invoked and results obtained using OpenGL by calling the glReadPixels function. Note that there is one depth-buffer pixel for each detector in the sensor focal plane array.

Next, with reference to block 914, the depth-buffer data is transformed into range data, which defines the synthetic range image. Block 914 reads the depth values from the depth-buffer computed with the computer graphics hardware and transforms them into values which have linear units of length. The depth-buffer is read using OpenGL as:
glReadPixels(0, 0, width, heigth, GL_DEPTH_COMPONENT, GL_FLOAT, depthbuf);
where, width is the width in pixels and height is the height in pixels of the LADAR focal plane array and of the depthbuf array which is where the depth-buffer computational result is obtained on call return.

Synthetic Range Image

The term "synthetic range image" describes electronic range data representing the physical scene formed by range rendering a target model at a particular pose during analysis of a current hypothesis. The synthetic range image of a particular iteration 'g' is notationally referred to as $R^{S,g}$ where g represents the hypothesis (and corresponding pose parameter values) at which the target model of the current model hypotheses set will be rendererd. Note that the synthetic range image is of the same size (pixel-wise) as the sensor range image. A synthetic range image is mathematically described by Equation 1, where a pixel at location if in the synthetic range image is notationally represented herein as $f_{ij}^S$=true if the pixel is on the rendered 3-D target model in the synthetic range image as $f_{ij}^S$=false if it lies off the rendered 3-D target model in the synthetic range image.

$$R^s = \{r_{ij}^s, i=1, \ldots b, j=1 \ldots c\} \qquad \text{Equation 1}$$

Hypothesis-specific synthetic range images are notated using the index 'g' to represent the hypothesis the synthetic range image is used to test, as in Equation 2.

$$R^{s,g} = \{r_{ij}^{s,g}, i=1, \ldots b, j=1 \ldots c\} \qquad \text{Equation 2}$$

A pixel at location ij in me synthetic range image of a '$g^{th}$' hypothesis is notationally represented herein as $f_{ij}^{S,g}$=true if the pixel is on the rendered 3-D target model in the synthetic range image of the '$g^{th}$' hypothesis and as $f_{ij}^{S,g}$=false if it lies off the rendered 3-D target model in the synthetic range image of the '$g^{th}$' hypothesis. For example, $R^{s,1}$ would represent the synthetic range image rendered for the first hypothesis of a model hypothesis set and it would be formed of range values as mathematically represented in Equation 3.

$$R^{s,1} = \{r_{ij}^{s,1}, i=1, \ldots b, j=1 \ldots c\} \qquad \text{Equation 3}$$

Figure 6:
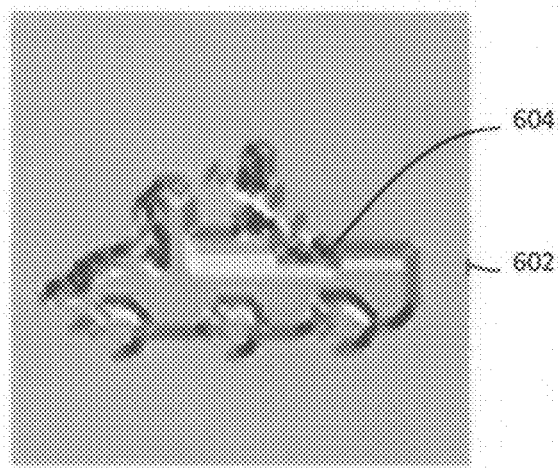
FIG. 6 illustrates an exemplary synthetic range image of a scene including an embodiment of a target.
Figure 7:
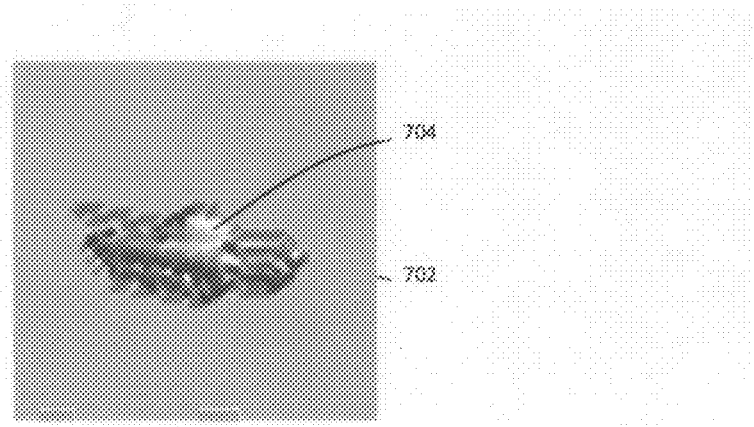
FIG. 7 illustrates an exemplary synthetic range image of a scene including an embodiment of a target.

FIGS. 6 and 7 illustrate synthetic range images of different target models. 602 is a synthetic range image that includes a rendered target model 604 of an exemplary tank. 702 is a synthetic range image that includes a rendered target model 704 of a different tank than 604.

Figure 8:
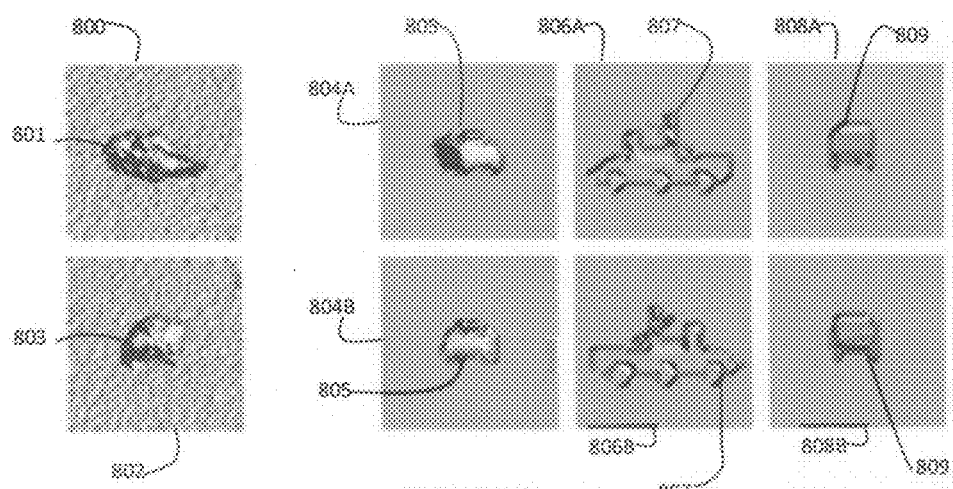
FIG. 8 illustrates Various exemplary range images, each of a different scene, and various exemplary synthetic range images.

With reference to FIG. 8, 800 illustrates an exemplary sensor range image including an exemplary target 801. 804A, 806A, and 808A are exemplary synthetic range images of scene 800 including different target models 805, 807, 809 at different poses. 802 illustrates an exemplary sensor range image including an exemplary target 803. 804B, 806B, and 808B are exemplary synthetic range images of scene 802 using the same models as used in die corresponding exemplary synthetic range images of scene 800, but at different poses. For example, synthetic range images 804A and 804B render images including target model 805, hut at different poses (805 in synthetic range image 804A is at a different pose than 805 in FIG. 804B).

Target Information (Input)

The "target information" input includes information describing pose (referred to as "pose information input") and identity (or class type) of a recognized target localized using a known, well-known, or conventional method or system. The "detected target" is a collection of pixels in the sensor range image that collectively comprise the target detected within the range image of the imaged scene.

The input pose information is notationally referred to as $P_{input}$. The input pose information defines an estimated pose of the detected target within the sensor range image via a set of target pose parameters. Though the information regarding initial models and pose are considered input and may be either arbitrarily selected or derived using any known, well-known, or conventional process, we consider generation of the input in some detail as follows. Where conventional known, or well-known range image processing is used to provide target detection and pose information input, the input is typically generated by performing segmentation, feature extraction, recognition and localization.

The process of recognition determines the identity of a target instance. Regarding recognition, the object (or target) instances in a 3D scene model may be of various types. One type is parameterized shape models, e.g. spheres, cylinders, cuboids, or superquadrics. A second type is arbitrarily-shaped object instances that match object models in a library of object models. In this case, each model in the library describes a specific object. Recognizing object instances found in such a library is referred to as "object recognition", see Chapter 10 of E. Trucco and A. Verri, *Introductory Techniques for 3-D Computer Vision,* Prentice Hall, 1998; also see Shimon Ullman, *High-level Vision,* The MIT Press, 1997 A third type is arbitrarily-shaped object instances that match class models in a library of class models. In this case, each model in the library describes a class of related objects, e.g. chairs, trucks, ears, barns, etc. Such a class model is sometimes called a "class prototype". In various embodiments, the present invention can be applied to each of these types of object instances, as described below.

Localization is typically performed by computing the transformation from a model (or class prototype) coordinate frame of reference to the scene coordinate frame of reference that would place the object model in registration with the object in the scene (detected target). Localization results in the initial pose estimate for the target within the scene.

In other embodiments, the initial pose parameters are set equal to the x,y,z location of the average position of the pixels that comprise the detected target in the range image. Where this is employed, the range image is converted from the $r_{i,j}$ form to the xyz range form using a standard transformation matrix and offsets, and the x, y, z values of the pixels that comprise the detected target are averaged. In these embodiments, the initial roll, pitch, and yaw values are selected based on a-priori knowledge of the environment, type of object, and potentially intel. For example, if we know that the object is a land based vehicle on the ground, we might set the roll to zero because land based vehicles are less likely to experience significant roll.

Target Model (Input)

A "target model", as used herein, is a 3-D wire grid model of a potential target match (to the detected target) modeled in a model coordinate frame of reference (set model origin to the middle of its extent). The target model for a model hypotheses set describes the model to be used during the current model hypotheses set. The "target model input" is information that identifies a selection of one of the models within the model set for the current iteration. In embodiments in which multiple models are contemplated as potential matches, a model is iteratively analyzed until a decision is made to move on to a different object model in the model set. The collection of iterations performed (hypotheses tested) on a single model is referred to collectively as a "model iteration set".

To avoid convoluting the description with reference to models in different model hypotheses sets, the remainder of the detailed description focuses on description of iteration through a single model hypotheses set, but it is understood mat some embodiments include performing multiple model hypotheses sets, each on a different model within a model set.

Target Hypothesis

A target hypothesis for the purposes of this description and claims refers to a particular set of values of target pose parameters (position and orientation).

Matching Score Threshold Value

The matching score threshold value is statistically based on test trials (or training). The value of this threshold can be set based on how finely it is desired to differentiate between objects. Alternatively, the threshold can represent a percentage match. For example, where a threshold score represents a required 70 percent match, the percentage would be calculated by dividing the matching score by the sum of k, b, and c in Equation 8.

Apparatus Embodiments

With reference to FIG. 1, system embodiments include a Central Processing Unit 2 operatively associated with electronic memory 4 and a graphics processing unit 6, operatively associated with a display monitor, to display a visual depiction of the range-synced synthetic range image that produces a match. A central processing unit 2 is the hardware within a computer that carries out the instructions of a computer program by performing the basic arithmetical, logical, and input/output operations of the system. CPU 2 is operatively associated with memory 4, which includes data and stored instructions. CPU 2 and memory 4 are both operatively associated with the graphics processing unit 6. Graphics processing unit (GPU) 6, also known as a visual processing unit (VPU), is a specialized electronic circuit designed to rapidly manipulate and alter memory to accelerate the building of images in a frame buffer intended for output to a display. The memory receives the input 4, and stores software, which the CPU and GPU use to perform the processes described herein.

8 designates a motherboard to which the CPU, memory, and GPU are electrically associated. 10 is a display monitor to display a visual depiction of the range-synced synthetic range image that produces a match. In some applications, depending on the verification requirements, a visual verification by a user is important to provide an additional layer of validation before acting on the match (for example dedicating resources to attack based on the match); therefore, some embodiments include the display monitor 10.

Article of Manufacture

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium 6 can be any non-transitory processor readable medium (media), including, for example, a magnetic storage media, "floppy disk", CD-ROM, RAM, a PROM, an EPROM, a FLASH-EPROM, any other memory chip or cartridge, a file server providing access to the programs via a network transmission line, holographic unit, etc. Of course, those skilled in the art will recognize that many modifications may be made to this configuration without departing from the scope. In some system embodiments, the electronic processor is co-located with the processor readable medium; in other system embodiments, the electronic processor is remotely located from the processor readable medium. It is noted that the steps/acts/processes described herein including the figures can be interpreted as representing data structures or sets of instructions for causing the computer readable medium to perform the step/act/process. Identifying or 'electronically identifying' involves any one or more of the following: 1) associating an electronic marker, tag, or value with said target model that identifies it as a match; 2) storing data associated with said target model or the pararmeters of the best match hypothesis in memory at a location indicative that the hypothesis/model matches the target; 3) displaying it the synthetic range image on an visual display; or 4) any conventional means of identifying a target model as a match.

Range-Sync Embodiments—Non-Specific Hypothesizer

Figure 2:
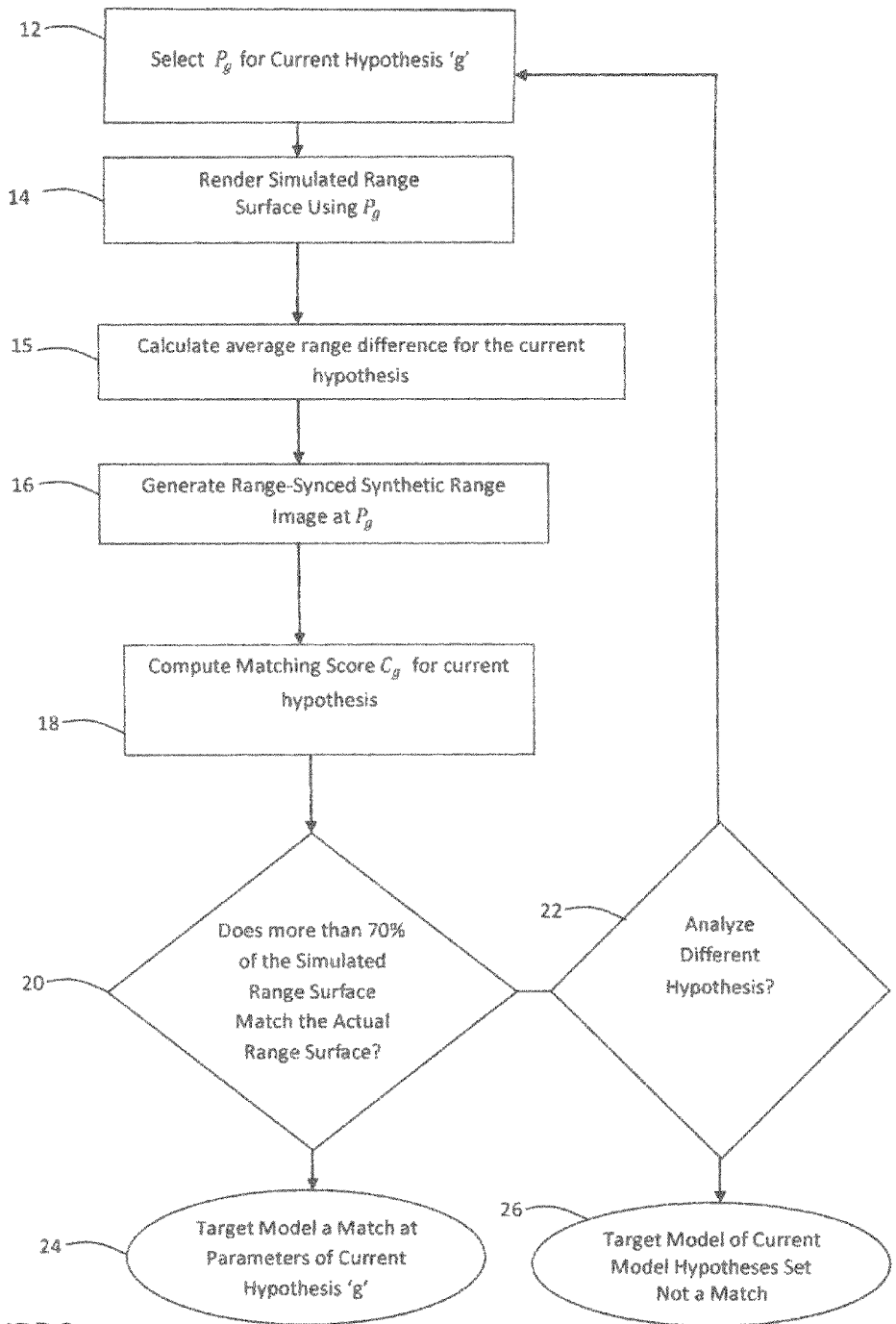
FIG. 2 provides an exemplary diagram of steps performed during some embodiments of the invention.

In general, with reference to FIG. 2, rang-sync embodiments include receiving parameter values for a current target hypothesis 12, rendering a synthetic range image according to the selected parameter values of the current target hypothesis 14, generating an average range difference between the sensor target range image and the synthetic range image for the current hypothesis 15, generating a range-synced synthetic range image for the current target hypothesis 16, computing a matching score for the current target hypothesis 18, determining whether the matching score for the current target hypothesis is greater than a predetermined threshold 20, and iterating through the selecting, rendering, rang-syncing, calculating, and determining steps for subsequent hypotheses until a target hypothesis produces a matching score greater than the pre-determined threshold 24 or the model hypothesis iteration set is completed (as determined in decision diamond 22)—in which case the target model will not be declared a match and the model hypotheses set is complete.

Each of these steps or sub-processes is treated is more detail.

Block 12 includes receiving parameter values parameters $P_g$ for a target hypothesis 'g'. The plurality of target search parameters are selected from the group of search parameters describing location, orientation, and velocity of a target within a sensor range image R generated from range data collected by a sensor. Receiving parameter values for a hypothesis $P_g$ is treated in detail supra.

Once the input information is received, a synthetic range image $R^{s,g}$ is generated for the target hypothesis 'g' by rendering a 3-D wire grid model (that was input) at a pose defined by the parameter values $P_g$, as is shown in block 14. Rendering the synthetic range image at the pose parameter values of the current hypothesis $P_g$ is performed using OpenGl according to conventional techniques and a last graphics processing unit.

Next with reference to block 15, embodiments include computing an average range difference $a_g$ for the current hypothesis g between the sensor target range image and the synthetic range image $R^{s,g}$ of the hypothesis being tested, according to equation 4.

$$a_g = \frac{\sum_{i=1}^{b}\sum_{j=1}^{c} \begin{matrix} r_{ij}^{s,g} - r_{ij} & \text{if } f_{ij}^{s,g} = \text{true} \\ 0 & \text{if } f_{ij}^{s,g} = \text{false} \end{matrix}}{\sum_{i=1}^{b}\sum_{j=1}^{c} \begin{matrix} 1 & \text{if } f_{ij}^{s,g} = \text{true} \\ 0 & \text{if } f_{ij}^{s,g} = \text{false} \end{matrix}} \quad \text{Equation 4}$$

Next, with reference to block 16, embodiments generate a range-synced synthetic range image for the current hypothesis $R_{sync}^{s,g}$ adjusting range values of pixels in the synthetic range image for the current hypothesis according to Equation 5.

$$R_{sync}^{s,g} = \{(r_{ij}^{s,g} - a_g d), i=1,\ldots b, j=1\ldots c\} \quad \text{Equation 5}$$

A pixel at location ij in the range-synced synthetic range image of a '$g^{th}$' hypothesis is notationally represented herein as $f_{ij,sync}^{s,g}$=true if the pixel is on the rendered 3-D target model in the range-synced synthetic range image of the '$g^{th}$' hypothesis and as $f_{ij,sync}^{s,g}$=false if it lies off the rendered 3-D target model in the range-synced synthetic range image of the '$g^{th}$' hypothesis.

Next, with reference to block 18, a matching score for the current hypothesis $C_g$ is computed as in Equation 8, where $$T = L\left(\frac{1}{2}\right)^v,$$

L and k are set experimentally based on the sensor range noise and the object modeling errors, where var2 is greater than var3, var1 value is greater than L, and $d_{i,j\_sync}^{g}$ is a discrepancy between the sensor range image and range-synced synthetic range image at pixel location ij in the range-synced synthetic range image mathematically defined by Equations 7, which employs Equation 8.

$$C_g = \sum_{v=0}^{k}\sum_{i=0}^{b}\sum_{j=0}^{c} \begin{cases} \text{var2} & d_{i,j}^g < T \\ \text{var3} & d_{i,j}^g \geq T \end{cases} \quad \text{Equation 6}$$

$$d_{i,j\_sync}^g = \quad \text{Equation 7}$$

$$\begin{cases} \text{Minimum}\left(\sqrt{((r_{i,j}^{s,g} - a_g d) - N_{ij})^2}\right) & \text{if } f_{ij,sync}^{s,g} = \text{true} \\ \text{var1} & \text{if } f_{ij,sync}^{s,g} = \text{false} \end{cases}$$

$$N_{ij} = \{(r_{mn}, m), m=(i-h),\ldots(i+h), n=(j-w),\ldots(j+w)\} \quad \text{Equation 8}$$

In some embodiments, h and w in Equation 8 are selected from the range of values between 0 and 5. In some embodiments, h and w are the same value. In some embodiments h and w are equal to 1.

When the matching score for a current hypothesis $C_g$ exceeds the threshold value, as determined in block 20, the target model at the target pose parameters of the current hypothesis $P_g$ is declared a match, and the process/program does not search any additional hypotheses or target models.

When the matching score for a current hypothesis $C_g$ does not exceed the threshold value, the program determines whether a subsequent hypothesis will be analyzed for the model hypotheses set, in block 22.

When another hypothesis will not be tested, the process does not declare the target model of the current model hypotheses set to be a match 26, and where only a single target model is tested, the process ends for the model hypotheses set. Where multiple models are tested, as described supra, the program would select a new target model for a different model hypotheses set, and perform blocks 12-22 for at least one hypothesis of the new target model.

Parameter Value Selection

Figure 3:
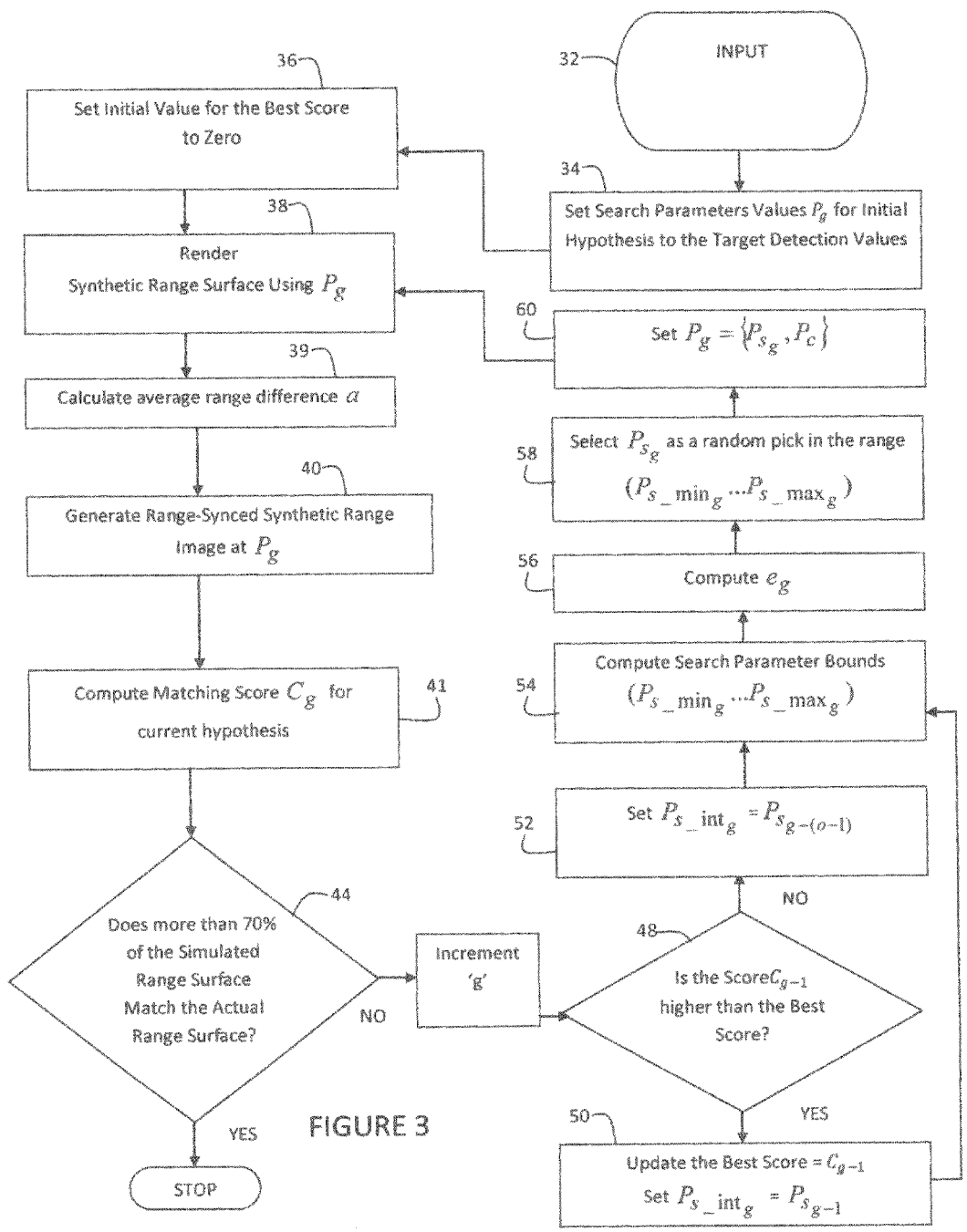
FIG. 3 provides an exemplary diagram of steps performed during some embodiments of the invention.

With reference to FIG. 3, in some embodiments, the parameter values are selected according to the particulars described in this "Parameter Value Selection" section.

Input block 32 describes input information as defined above. This block indicates receipt of the data in input into memory in a form in which CPU and GPU can process. To reiterate, as described above, input information input in block 32 is: 1) sensor range image; 2) target information; 3) initial target search parameter extents; and 4) target model to be used during the current model hypotheses set. Also recall that this description will focus on iterations through a single model hypotheses set, though other embodiments include instructions and processes that proceed through multiple model hypotheses sets by performing the processes in this section on multiple input target models.

With reference to block 34, parameter values $P_g$ for an initial hypothesis are set equal to the pose values derived from the target pose information that is input. So, where the target pose information input in block 32 is $P_{input}$, the parameter values for an initial hypothesis of a model hypotheses set are represented as $P_{input}$. For all non-initial iteration hypotheses $P_g$ is determined according to blocks 48 through 58. For the purposes in this section, 'g' is taken to increment once a hypothesis is determined to yield a high enough Matching Score. So, using this notation, $P_g$ is the set of parameter values used to test a hypothesis immediately following the hypothesis tested using the target parameter values of the immediately preceding hypothesis $P_{g-1}$.

$P_g$ for a non-initial hypothesis g is determined as follows:

With reference to block 48, determine whether the matching score of the preceding hypothesis is greater than the Best Score, and With reference to block 50, when $C_{g-1}$>BestScore,
- Update BestScore=$C_{g-1}$; and
- Set an intermediate parameter value for each of the target search parameters equal to the parameter value of the search parameter in the preceding iteration, where the set of intermediate parameter values are mathematically represented collectively as $P_{s\_int_g}=P_{s_{g-1}}$. Using this notation, $P_{s\_int_g}=\{P_{s\_int_g}(a), a=1 \ldots b\}$, where b is the number of search parameters. So, using ibis notation, if there are three search parameters, let's say the x, y, and z position, $P_{s\_int_g}(1)$ would be the intermediate search parameter value assigned to the x-position for the $g^{th}$ hypothesis, $P_{s\_int_g}(2)$ would be the intermediate search parameter value assigned to the y-position for the $g^{th}$ hypothesis, and $P_{s\_int_g}(3)$ would be the parameter value assigned to the z-position for the $g^{th}$ hypothesis.

With reference to block 52, when $C_{g-1} \leq$ BestScore, set an intermediate parameter value for each of the target search parameters equal to the corresponding values of the target search parameters of the hypothesis that produced the highest score, mathematically represented in Equation 9, where b is the number of search parameters and o is the number of hypotheses tested since BestScore was last updated.

$$P_{s\_int_g}(a)=P_{s_{g-(o-1)}}(a), a=1 \ldots b \qquad \text{Equation 9}$$

As a notational example, for example, if the current hypothesis is the sixth hypothesis, 3 hypotheses have been tested since BestScore was last updated, and there are 2 search parameters, x, and y position, the intermediate parameter value for the x position of the sixth hypothesis—$P_{s\_int_6}(1)$—would be set equal to the value of the x position parameter of the second hypothesis—$P_{s_2}(1)$—and the intermediate parameter value for the y position of the sixth hypothesis—$P_{s\_int_6}(2)$—would be set to the y position parameter value of the second hypothesis—$P_{s_2}(2)$.

With reference to block 54, compute a minimum and maximum search parameter bounds and for each of the search parameters, respectively, according to equations 10 and 11, where b is the number of search parameters.

$$P_{s\_min_g}(a)=P_{s\_int_g}(a)-e_{g-1}(a), a=1 \ldots b \qquad \text{Equation 10}$$

$$P_{s\_max_g}(a)=P_{s\_int_g}(a)+e_{g-1}(a), a=1 \ldots b \qquad \text{Equation 11}$$

With reference to block 58, select each parameter value of the search parameters for the current hypothesis, (the set of search parameter values collectively referred to as $P_{s_g}$), as a random pick in the range $(P_{s\_min_g} \ldots P_{s\_max_g})$ according to Equation 12, where U( ) is a uniform probability function and 1 is set to the degree to which a normal distributed random variable is desired.

$$P_{s_g} = P_{s\_int_g} + \frac{\sum_1^l \{U(P_{s\_min_g} \ldots P_{s\_max_g})\} - lP_{s\_int_g}}{l+1} \qquad \text{Equation 12}$$

For example, where there are only two search parameters, say an x-position (first search parameter) and a y-position (second search parameter).

$$P_{s_g}=\{P_{s_g}(1), P_{s_g}(2)\}, \text{where}$$

$$P_{s_g}(1) = P_{s\_int_g}(1) + \frac{\sum_1^l \{U(P_{s\_min_g}(1) \ldots P_{s\_max_g}(1))\} - lP_{s\_int_g}}{l+1} \qquad (1)$$

$$P_{s_g}(2) = P_{s\_int_g}(2) + \frac{\sum_1^l \{U(P_{s\_min_g}(2) \ldots P_{s\_max_g}(2))\} - lP_{s\_int_g}}{l+1} \qquad (2)$$

Finally, with reference to block 60, the search parameter values for the $g^{th}$ iteration are set to the search parameter values in combination with the constant parameter values, mathematically collectively represented as $P_g=\{P_{s_g}, P_c\}$ Example Iterations Through an Exemplary Embodiment Using Specific Hypothesizer An example is provided in this "Example" section to illustrate progression through multiple hypotheses of a model hypotheses set using a specific hypothesizer described above. With reference to FIG. 3. Input Information 32 provides the following identified supra.

With reference to block 34, embodiments proceed by setting search parameter values $P_g$ for an initial iteration (g=1) equal to $P_{input}$, resulting in the search parameter values for the initial iteration $P_1=P_{input}$.

Embodiments then set BestScore to an initial value of zero, as is shown in block 36.

With reference so block 38, embodiments then render the range image $R^{s,1}$ using $P_1$, thereby generating a synthetic range image for the initial hypothesis having range values notationally represented as $R^{s,1}=\{r_{ij}^{s,1}, i=1,\ldots b, j=1 \ldots c\}$. Rendering at a specific pose has been treated above.

With reference to block 39, embodiments then determine an average range difference tor the current hypothesis $a_1$ between the sensor target range image and the initial hypothesis synthetic range image $R^{s,1}$ according to Equation 13.

$$a_1 = \frac{\sum_{i=1}^{b}\sum_{j=1}^{c}\begin{cases} r_{ij}^{S,1}-r_{ij} & \text{if } f_{ij}^{s,1}=\text{true} \\ 0 & \text{if } f_{ij}^{s,1}=\text{false}\end{cases}}{\sum_{i=1}^{b}\sum_{j=1}^{c}\begin{cases} 1 & \text{if } f_{ij}^{s,1}=\text{true} \\ 0 & \text{if } f_{ij}^{s,1}=\text{false}\end{cases}} \quad \text{Equation 13}$$

Next, with reference to block 40, embodiments generate a range-synced synthetic range image for the initial hypothesis $R_{sync}^{S,1}$ adjusting range values of pixels in the synthetic range image for the initial hypothesis according so Equation 14.

$$R_{sync}^{S,1}=\{(r_{ij}^{s,1}-a_1 d), i=1,\ldots b, j=1 \ldots c\} \quad \text{Equation 14}$$

A pixel at location ij in the range-synced synthetic range image of the first hypothesis is notationally represented herein as $f_{ij,sync}^{S,1}$=true if the pixel is on the rendered 3-D target model in the range-synced synthetic range image of the 'first' hypothesis and As $f_{ij,sync}^{S,1}$=false if it lies off the rendered 3-D target model in the range-synced synthetic range image of the 'first' hypothesis.

Next, with reference to block 41, a matching score for the current hypothesis $C_1$ is computed as in Equation 15, where $$T = L\left(\frac{1}{2}\right)^v,$$

L and k are set experimentally based on the sensor range noise and the object modeling errors, where var2 is greater than var3, and $d_{i,j\_sync}^1$ a discrepancy between the senior range image and range-synced synthetic range image at pixel location ij in the range-synced synthetic range image mathematically defined by Equations 16, which employs Equation 17.

$$C_1 = \sum_{v=0}^{k}\sum_{i=0}^{b}\sum_{j=0}^{c}\begin{cases} \text{var2} & d_{i,j\_sync}^1 < T \\ \text{var3} & d_{i,j\_sync}^1 \geq T \end{cases} \quad \text{Equation 15}$$

$$d_{i,j\_sync}^g = \begin{cases} \text{Minimum}\left(\sqrt{((r_{i,j}^{S,g}-a_g d)-N_{ij})^2}\right) & \text{if } f_{ij,sync}^{S,g}=\text{true} \\ \text{var1} & \text{if } f_{ij,sync}^{S,g}=\text{false} \end{cases} \quad \text{Equation 16}$$

$$N_{ij}=\{(r_{mn},m), m=(i-h),\ldots(i+h), n=(j-w),\ldots(j+w)\} \quad \text{Equation 17}$$

In some embodiments, h and w in Equation 8 are selected from the range of values between 0 and 5. In some embodiments, h and w are the same value. In some embodiments h and W are equal to 1. L is a value (in meters) in the range of (and including) 0 to 10, depending on the fineness of the sensor. k is a value in the range of (and including) 0 to 7. In some embodiments, L=3 and k=0. In other embodiments, L=8 and k=7.

For the purposes of this example, let's set a threshold value equal to 70 and a $C_1$=55. As $C_1$ is less than the threshold value (as determined in block 44), g is incremented to '2' (block 46) and a determination regarding whether to update BestScore and what value to set $P_{s\_int_2}$ is made in decision diamond 48.

As $C_1$ is greater than zero, the process proceeds to updating the BestScore by setting it equal to $C_1$, and setting intermediate search parameter values equal to the values of the corresponding search parameter of the immediately preceding hypothesis, mathematically represented as $P_{s\_int_2}=P_{s_1}$, and shown in block 50.

The process then proceeds to computing minimum and maximum bounds for each of the search parameters as is represented in Equations 18 and 19, where $e_1$ is the search parameter extent input.

$$P_{s\_min_2}=P_{s\_int_2}-e_1 \quad \text{Equation 18}$$

$$p_{s\_max_2}=P_{s\_int_2}+e_1 \quad \text{Equation 19}$$

The process proceeds by computing an $e_2$ value according to Equation 20, though this won't be used in computing $P_2$, as in block 56.

$$e_2=e_1 \times 0.5 \quad \text{Equation 20}$$

The process then proceeds to selecting parameter values for the second hypothesis $P_2$ as in block 58 according to Equation 21.

$$P_{s_2} = P_{s\_int_2} + \frac{\sum_{1}^{l}\{U(P_{s\_min_2}\ldots P_{s\_max_2})\}-lP_{s\_int_2}}{l+1} \quad \text{Equation 21}$$

With reference to block 38, embodiments then render the synthetic range image for the second hypothesis $R^{s,2}$ using $P_2$, thereby generating a synthetic range surface for the initial hypothesis having range values notationally represented as in Equation 22.

$$R^{s,2}=\{r_{ij}^{s,2}, i,\ldots b, j=1 \ldots c\} \quad \text{Equation 22}$$

Rendering at a specific pose has been treated above.

With reference to block 39, embodiments then determine an average range difference for (he second hypothesis $a_2$ between the sensor range image and the second hypothesis synthetic range image $R^{s,2}$ as in Equation 23.

$$a_2 = \frac{\sum_{i=1}^{b}\sum_{j=1}^{c}\begin{cases} r_{ij}^{S,2}-r_{ij} & \text{if } f_{ij}^{s,2}=\text{true} \\ 0 & \text{if } f_{ij}^{s,2}=\text{false}\end{cases}}{\sum_{i=1}^{b}\sum_{j=1}^{c}\begin{cases} 1 & \text{if } f_{ij}^{s,2}=\text{true} \\ 0 & \text{if } f_{ij}^{s,2}=\text{false}\end{cases}} \quad \text{Equation 23}$$

Next, with reference to block 46, embodiments generate a range-synced synthetic range image fix the initial hypothesis $R_{sync}^{S,2}$ adjusting range values of pixels in the synthetic range image tor the initial hypothesis according to Equation 24.

$$R_{sync}^{S,2}=\{(r_{ij}^{s,2}-a_2 d), i=1,\ldots b, j=1 \ldots c\} \quad \text{Equation 24}$$

A pixel at location ij in the range-synced synthetic range image of the first hypothesis is notationally represented herein as $f_{ij,sync}^{S,2}$=true if the pixel is on the rendered 3-D target model in the range-synced synthetic range image of the 'first' hypothesis and as $f_{ij,sync}^{S,2}$=false if it lies off the rendered 3-D target model in the range-synced synthetic range image of the 'first' hypothesis.

Next, with reference to block 41, a matching score for the current hypothesis $C_2$ is computed as in Equation 25, where $$T = L\left(\frac{1}{2}\right)^v,$$

L and k are set experimentally based on the sensor range noise and the object modeling errors, where var2 is greater than var.3, and $d_{i,j\_sync}^2$ is a discrepancy between the sensor range image and range-synced synthetic range image at pixel location ij in the range-synced synthetic range image mathematically defined by Equations 26, which employs Equation 27.

$$C_2 = \sum_{v=0}^{k} \sum_{i=0}^{b} \sum_{j=0}^{c} \begin{cases} \text{var2} & d_{i,j\_sync}^2 < T \\ \text{var3} & d_{i,j\_sync}^2 \geq T \end{cases} \quad \text{Equation 25}$$

$$d_{i,j_{sync}}^2 = \quad \text{Equation 26}$$

$$\begin{cases} \text{Minimum}\left(\sqrt{\left((r_{i,j}^{S,2} - a_2 d) - N_{ij}\right)^2}\right) & \text{if } f_{ij,sync}^{S,2} = \text{true} \\ \text{var1} & \text{if } f_{ij,sync}^{S,2} = \text{false} \end{cases}$$

$$N_{ij} = \{(r_{mn}, m), m=(i-h), \ldots (i+h), n=(j-w), \ldots (j+w)\} \quad \text{Equation 27}$$

For the purposes of this example, let's set $C_2$=52. As $C_2$ is less than the hypothetical threshold value, g is incremented to '3' and a determination regarding whether to update BestScore and what value to set $P_{s\_int3}$ is made. As $C_2$<BestScore (which was set to 55), $P_{s\_int_3}$ is set equal to $P_{s_1}$ (because the number of hypotheses tested since BestScore was updated is 1, so o=3, and therefore, where g=3, g−(o−1) =1). A non-mathematical way to describe the value to which the intermediate parameter value for a current non-initial iteration is set is to state that the $P_{s\_int_g}$ for a current iteration is set to the search parameter values that resulted in the highest matching score.

The process then proceeds to computing minimum and maximum bounds for the search parameters of the third hypothesis according to Equations 28 and 29.

$$P_{s\_min3} = P_{s_{int3}} - e_2 \quad \text{Equation 28}$$

$$P_{s\_max3} = P_{s_{int3}} + e_2 \quad \text{Equation 29}$$

The process proceeds by computing an $e_3$ value, though this won't be used in computing $P_3$ as follows $e_3 = e_2 \times 0.5$ The process then proceeds to selecting search parameter values for the second Hypothesis $P_{s_3}$ as follows:

$$P_{s_3} = P_{s\_int3} + \frac{\sum_{1}^{l} \{U(P_{s\_min3} \ldots P_{s\_max3})\} - lP_{s\_int3}}{l+1},$$

and would then proceed to generating a matching score for the third hypothesis using $P_3 = \{P_{s_3}, P_c\}$ to render a synthetic range image, range sync, and compute a matching score, at which point a decision about whether to continue would be made.

Non-Range-Sync Embodiments

Embodiments that don't range-sync simply omit the steps (and/or don't include instructions that cause the computer to perform the function/processes/steps) 15 and 16, and 39 and 40, in FIGS. 2 and 3, respectively; these embodiments compute the matching score for a hypothesis using the synthetic range image generated during the current iteration (as opposed to a range-synced synthetic range image).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of identifying a target in a sensor range image, comprising:

receiving first target parameter values $P_1$ for a plurality of target parameters for a first target hypothesis of a plurality of target hypotheses, wherein said plurality of target parameters are selected from the group of parameters describing location and orientation of said target;

wherein said sensor range image is notationally defined as $R=\{(r_{ij}), i=1, \ldots b, j=1 \ldots c\}$, where b represents the number of columns of pixels in said sensor range image, c represents the number of rows of pixels in said sensor range image, and $r_{ij}$ represents the range between an object at point ij in said sensor range image and said sensor;

receiving a first set of parameter extent values $e_1$ for a plurality of target search parameters of said plurality of target parameters, where each value of said first set of parameter extent values $e_1$ describes a search space range of a corresponding of said plurality of target parameters;

electronically generating a first synthetic range image of said scene for said first target hypothesis by rendering a 3-D wire grid model of a plurality of 3-D wire models of targets to be identified at said target parameter values; wherein one of said plurality of 3-D models has a surface which is a match to a surface of said target, where said first synthetic range image $R^{s,1}$ is mathematically defined as $R^{s,1} = \{r_{ij}^{s,1}, i=1, \ldots b, j= 1 \ldots c\}$, where b represents the number of columns of pixels in said synthetic range image, c represents the number of rows of pixels in said synthetic range image $R^{s,1}$, and $r_{ij}^{s,1}$ represents the range between an object at point ij in said first synthetic range image and said sensor;

electronically computing a first matching score $C_1$ for said first target hypothesis, where said first matching score $C_1$ is mathematically defined as $$C_1 = \sum_{v=0}^{k} \sum_{i=0}^{b} \sum_{j=0}^{c} \begin{cases} \text{var2} & d_{ij}^1 < T \\ \text{var3} & d_{ij}^1 \geq T \end{cases},$$

$$T = L\left(\frac{1}{2}\right)^v,$$

where L is a first pre-determined value, where var2 is a second pre-determined value, where var3 is a third pre-determined value, where said second pre-determined value is greater than said third pre-determined value, where k is a fourth pre-determined value, where $d_{ij}$ is a discrepancy between said sensor range image and said synthetic range image at location ij of said synthetic range image and is mathematically defined as $$d_{ij}^1 = \begin{cases} \text{Minimum}\left(\sqrt{\left(r_{ij}^{S,1} - N_{ij}\right)^2}\right) & \text{if } f_{i,j}^{S,1} = \text{true} \\ \text{var1} & \text{if } f_{i,j}^{S,1} = \text{false} \end{cases},$$

where var1 is a fifth pre-determined value, where said fifth pre-determined value is greater than or equal said first pre-determined value, where $N_{ij}$ is mathematically defined as $N_{ij} = \{(r_{mn}, m), m=(i-h), \ldots (i+h), n=(j-w), \ldots (j+w)\}$, where h is a sixth pre-determined value and w is a seventh pre-determined value;

electronically determining whether said first matching score $C_1$ exceeds a pre-determined threshold score; and when said first matching score $C_1$ exceeds said pre-determined threshold score, declaring said 3-D wire grid target model and said first target parameter values $P_1$ to be a match;

when said first matching score $C_1$ does not exceed said pre-determined threshold score:

determining whether said first matching score $C_1$ is greater than a preceding matching score of a hypothesis immediately preceding said first matching score, and when said first matching score $C_1$ is greater than said preceding matching score:

setting intermediate search parameter values for said plurality of search parameters to be equal to said first parameter values;

when said first matching score $C_1$ is not greater than said preceding matching score:

setting intermediate search parameter values for said plurality of search parameters to be equal to parameter values of a preceding hypothesis that resulted in a highest matching score;

computing upper search parameter bounds for each of said plurality of target parameters by adding one half of each of said set of first parameter extent values to its corresponding of said intermediate search parameter values;

computing lower search parameter bounds for each of said plurality of target parameters by subtracting one half of each of said set of first parameter extent values to its corresponding of said intermediate search parameter values;

randomly selecting a random value between said upper search parameter bounds and said lower search parameter bounds for each of said plurality of target parameters;

setting second target parameter values $P_2$ of said plurality of target parameters for a second target hypothesis by setting the value of each of said plurality of target parameter values equal to its corresponding said random value;

generating a second synthetic range image of said scene $R^{s2}$ for said second target hypothesis by rendering said selected 3-D wire grid model at said second target parameter values $P_2$, where said second synthetic range image is mathematically defined as $R^{s2} = \{(r_{ij}^{s2}), i=1, \ldots b, j=1 \ldots c\}$, wherein $r_{ij}^{s2}$ represents the range between an object at point ij in said second synthetic range image and said sensor;

electronically computing a second matching score $C_2$ for said second target hypothesis, where said second matching score $C_2$ is mathematically defined as $$C_2 = \sum_{v=0}^{k} \sum_{i=0}^{b} \sum_{j=0}^{c} \begin{cases} \text{var2} & d_{ij}^1 < T \\ \text{var3} & d_{ij}^1 \geq T \end{cases},$$

where $$T = L\left(\frac{1}{2}\right)^v,$$

where L is a first pre-determined value, where var2 is a second pre-determined value, where var3 is a third pre-determined value, where said second pre-determined value is greater than said third pre-determined value, where k is a fourth pre-determined value, where $d_{ij}$ is a discrepancy between said sensor range image and said synthetic range image at location ij of said synthetic range image and is mathematically defined as $$d_{ij}^1 = \begin{cases} \text{Minimum}\left(\sqrt{\left(r_{ij}^{S,1} - N_{ij}\right)^2}\right) & \text{if } f_{i,j}^{S,1} = \text{true} \\ \text{var1} & \text{if } f_{i,j}^{S,1} = \text{false} \end{cases},$$

where var1 is a fifth pre-determined value, where said fifth pre-determined value is greater than or equal said first pre-determined value, where $N_{ij}$ is mathematically defined as $N_{ij} = \{(r_{mn}, m), m=(i-h), \ldots (i+h), n=(j-w), \ldots (j+w)\}$, where h is a sixth pre-determined value and w is a seventh pre-determined value.

2. The method of claim 1, wherein h is selected from the range of values between and including zero and two; wherein w is selected from the range of values between and including zero and two.

3. The method of claim 1, wherein said generating a synthetic range image step is performed using a graphics processing unit.

4. The method of claim 1, where said sensor is a laser detection and ranging (LADAR) sensor.

5. The method of claim 2, where k=0 and L=3.0.

6. The method of claim 3, where k=7 and L=8.0.

7. A non-transitory computer readable medium having stored thereon a plurality of computer executable instructions that, when executed by a computer including a graphics processing unit, cause the computer to:

receive first target parameter values $P_1$ for a plurality of target parameters for a first target hypothesis of a plurality of target hypotheses, wherein said plurality of target parameters are selected from the group of parameters describing location and orientation of said target; wherein said sensor range image is notationally defined as $R=\{(r_{ij}), i=1, \ldots b, j=\ldots c\}$, where b represents the number of columns of pixels in said sensor range image, c represents the number of rows of pixels in said sensor range image, and $r_{ij}$ represents the range between an object at point ij in said sensor range image and said sensor;

receive a first set of parameter extent values $e_1$ for a plurality of target search parameters of said plurality of target parameters, where each value of said first set of parameter extent values $e_1$ describes a search space range of a corresponding of said plurality of target parameters;

electronically generate a first synthetic range image of said scene for said first target hypothesis by rendering a 3-D wire grid model of a plurality of 3-D wire models of targets to be identified at said target parameter values; wherein one of said plurality of 3-D models has a surface which is a match to a surface of said target, where said first synthetic range image $R^{s,1}$ is mathematically defined as $R^{s,1}=\{r_{ij}^{s,1}, i=1, \ldots b, j=1 \ldots c\}$, where b represents the number of columns of pixels in said synthetic range image, c represents the number of rows of pixels in said synthetic range image $R^{s,1}$, and $r_{ij}^{s,1}$ represents the range between an object at point ij in said first synthetic range image and said sensor;

electronically compute a first matching score $C_1$ for said first target hypothesis, where said first matching score $C_1$ is mathematically defined as $$C_1 = \sum_{v=0}^{k} \sum_{i=0}^{b} \sum_{j=0}^{c} \begin{cases} var2 & d_{ij}^1 < T \\ var3 & d_{ij}^1 \geq T \end{cases},$$

where $$T = L\left(\frac{1}{2}\right)^v,$$

where L is a first pre-determined value, where var2 is a second pre-determined value, where var3 is a third pre-determined value, where said second pre-determined value is greater than said third pre-determined value, where k is a fourth pre-determined value, where $d_{ij}$ is a discrepancy between said sensor range image and said synthetic range image at location ij of said synthetic range image and is mathematically defined as $$d_{ij}^1 = \begin{cases} \text{Minimum}\left(\sqrt{(r_{ij}^{S,1} - N_{ij})^2}\right) & \text{if } f_{i,j}^{S,1} = \text{true} \\ var1 & \text{if } f_{i,j}^{S,1} = \text{false} \end{cases},$$

where var1 is a fifth pre-determined value, where said fifth pre-determined value is greater than or equal said first pre-determined value, where $N_{ij}$ is mathematically defined as $N_{ij}=\{(r_{mn},m), m=(i-h), \ldots (i+h), n=(j-w), \ldots (j+d)\}$, where h is a sixth pre-determined value and w is a seventh pre-determined value;

electronically determine whether said first matching score $C_1$ exceeds a pre-determined threshold score; and when said first matching score $C_1$ exceeds said pre-determined threshold score, declaring said 3-D wire grid target model and said first target parameter values $P_1$ to be a match;

when said first matching score $C_1$ docs not exceed said pre-determined threshold score:

determine whether said first matching score $C_1$ is greater than a preceding matching score of a hypothesis immediately preceding said first matching score, and when said first matching score $C_1$ is greater than said preceding matching score:

set intermediate search parameter values for said plurality of search parameters to be equal to said first parameter values;

when said first matching score $C_1$ is not greater than said preceding matching score:

set intermediate search parameter values for said plurality of search parameters to be equal to parameter values of a preceding hypothesis that resulted in a highest matching score;

compute upper search parameter bounds for each of said plurality of target parameters by adding one half of each of said set of first parameter extent values to its corresponding of said intermediate search parameter values;

compute lower search parameter bounds for each of said plurality of target parameters by subtracting one half of each of said set of first parameter extent values to its corresponding of said intermediate search parameter values;

randomly select a random value between said upper search parameter bounds and said lower search parameter bounds for each of said plurality of target parameters;

set second target parameter values $P_2$ of said plurality of target parameters for a second target hypothesis by setting the value of each of said plurality of target parameter values equal to its corresponding said random value;

generate a second synthetic range image of said scene $R^{s2}$ for said second target hypothesis by rendering said selected 3-D wire grid model at said second target parameter values $P_2$, where said second synthetic range image is mathematically defined as $R^{s2}=\{(r_{ij}^{s2}), i=1, \ldots b, j=1 \ldots c\}$, wherein $r_{ij}^{s2}$ represents the range between an object at point ij in said second synthetic range image and said sensor;

electronically compute a second matching score $C_2$ for said second target hypothesis. where said second matching score $C_2$ is mathematically defined as $$C_2 = \sum_{v=0}^{k} \sum_{i=0}^{b} \sum_{j=0}^{c} \begin{cases} var2 & d_{ij}^1 < T \\ var3 & d_{ij}^1 \geq T \end{cases},$$

where $$T = L\left(\frac{1}{2}\right)^v,$$

where L is a first pre-determined value, where var2 is a second pre-determined value, where var3 is a third pre-determined value, where said second pre-determined value is greater than said third pre-determined value, where k is a fourth pre-determined value, where $d_{ij}$ is a discrepancy between said sensor range image and said synthetic range image at location ij of said synthetic range image and is mathematically defined as $$d_{ij}^1 = \begin{cases} \text{Minimum}\left(\sqrt{\left(r_{ij}^{S,1} - N_{ij}\right)^2}\right) & \text{if } f_{i,j}^{S,1} = \text{true} \\ \text{var1} & \text{if } f_{i,j}^{S,1} = \text{false} \end{cases},$$

where var1 is a fifth pre-determined value, where said fifth pre-determined value is greater than or equal said first pre-determined value, where $N_{ij}$ is mathematically defined as $N_{ij} = \{(r_{mn}, m), m=(i-h), \ldots (i+h), n=(j-w), \ldots (j+w)\}$, where h is a sixth pre-determined value and w is a seventh pre-determined value.

8. The medium of claim 7, wherein h is selected from the range of values between and including zero and two; where w is selected from the range of values between and including zero and two.

9. The medium of claim 7, wherein said generating a synthetic range image step is performed using a graphics processing unit.

10. The medium of claim 7, where said sensor is a laser detection and ranging (LADAR) sensor.

11. The medium of claim 8, where k=0 and L=3.0.

12. The medium of claim 9, where k=7 and L=8.0.

* * * * *

UNITED STATES PATENT AND TRADEMARK OFFICE
CERTIFICATE OF CORRECTION

PATENT NO. : 8,810,779 B1  
APPLICATION NO. : 13/974195  
DATED : August 19, 2014  
INVENTOR(S) : Jeffrey Jay Hilde Page 1 of 1

It is certified that error appears in the above-identified patent and that said Letters Patent is hereby corrected as shown below:

On the Title Page, Item (54) and in the Specification, Column 1, Lines 1-3, please delete the third word of the title ("AUTMATIC") and add a new third word of the title (--AUTOMATIC--).

Signed and Sealed this
Twenty-first Day of October, 2014

Michelle K. Lee
*Deputy Director of the United States Patent and Trademark Office*